US006944033B1

(12) United States Patent
Xu et al.

(10) Patent No.: US 6,944,033 B1
(45) Date of Patent: Sep. 13, 2005

(54) MULTI-PHASE INTERLEAVING ISOLATED DC/DC CONVERTER

(75) Inventors: Ming Xu, Blacksburg, VA (US); Fred C. Lee, Blacksburg, VA (US); Jinghai Zhou, Blacksburg, VA (US)

(73) Assignee: VA Tech Intellectual Properties, Blacksburg, VA (US)

( * ) Notice: Subject to any disclaimer, the term of this patent is extended or adjusted under 35 U.S.C. 154(b) by 122 days.

(21) Appl. No.: 10/457,907

(22) Filed: Jun. 10, 2003

Related U.S. Application Data

(60) Provisional application No. 60/425,127, filed on Nov. 8, 2002.

(51) Int. Cl.[7] .............................................. H02M 3/335
(52) U.S. Cl. .......................................... 363/16; 363/17
(58) Field of Search ........................... 363/71, 41, 132, 363/17, 127, 16

(56) References Cited

U.S. PATENT DOCUMENTS

| | | | | |
|---|---|---|---|---|
| 4,247,752 A | * | 1/1981 | Stringer | 219/130.33 |
| 5,027,264 A | * | 6/1991 | DeDoncker et al. | 363/16 |
| 5,933,339 A | * | 8/1999 | Duba et al. | 363/71 |
| 6,243,275 B1 | * | 6/2001 | Ferencz | 363/17 |
| 6,370,044 B1 | | 4/2002 | Zhang et al. | |

OTHER PUBLICATIONS

Li Xiao, Soft Switched PWM DC/DC Converter With Synchronous Rectifiers, 1996, no date.
McGraw–Hill Higher Education, Electric Machinery and Power System Fundamentals, 2002, no date.
Robert Watson, Analysis, Design, and Experimental Results of a 1–KW ZVS–FB–PWM Converter, etc., 1998, no date.

* cited by examiner

*Primary Examiner*—Rajnikant B. Patel
(74) *Attorney, Agent, or Firm*—Mary-Jacq Holroyd; Johnston, Holroyd & Associates

(57) ABSTRACT

A converter has a transformer with primary and secondary windings each having n coils in a series-series arrangement connected to primary and secondary sides. The primary side has n primary legs each having a top switch and a bottom switch and connected to the primary winding therebetween. The secondary side has n secondary legs, each secondary leg has a synchronous rectifier switch and an output filter inductor connected to the secondary winding therebetween. A complimentary control for the primary side comprising a gate driver transformer with primary winding in series with a DC blocking capacitor connected to a drain and a source of the top switch of each primary leg, and a gate drive transformer, for each primary leg, with secondary winding containing a leakage inductor and in series with a DC blocking capacitor and a damping resistor connected to gate and source of the secondary side synchronous rectifier.

29 Claims, 11 Drawing Sheets

MULTI-PHASE INTERLEAVING ISOLATED DC/DC CONVERTER

CROSS REFERENCE TO RELATED APPLICATIONS

This application claims the benefit of U.S. Provisional Application Ser. No. 60/425,127, filed on Nov. 8, 2002, the contents of which are incorporated herein in its entirety by reference.

FIELD OF THE INVENTION

The present invention relates to a DC/DC converter and, more particularly, to a multi-phase interleaving isolated DC/DC converter and a transformer winding utilized in a DC/DC converter.

BACKGROUND OF THE INVENTION

It is well known that users of power supplies for microprocessors are demanding higher current and lower output voltage. As current goes to 130 A, and even higher, the total conduction loss of conventional converters is significantly increased thereby causing severe thermal issues. To lower the on resistance of a conventional synchronous rectifier, more semiconductor devices are used. Furthermore, distributed magnetics are also used to reduce transformer winding losses. These solutions, however, typically result in higher cost and footprint increases while the power density decreases. Additionally, more device means more driving loss. These issues pose substantial challenges for future high current low voltage DC/DC converters used in microprocessors.

Rectifier diodes in DC/DC converters have been substituted with synchronous rectifiers, which have lower voltage drops. Synchronous rectifiers in self-driven implementations are typically driven with the secondary voltage of the transformer. In an external-driven implementation, the synchronous rectifiers are driven by gate-drive signals derived from the main switches of the primary side. A partially external-driven method is possible. See Li Xiao, Ramesh Oruganti, "Soft Switched PWM DC/DC Converter with Synchronous Rectifiers", in Telecommunications Energy Conference 1996. INTELEC'96, $18^{th}$ International, 1996. pp. 476–484.

Self-driven synchronous rectifier circuits are known. For example, U.S. Pat. No. 6,370,044 issued to Zhang et al. discloses a self-driven synchronous rectifier circuit. The self-driven synchronous rectifier circuit of Zhang et al. utilizes a primary and secondary winding for converting an input voltage into an output voltage, a first and second synchronous rectifier switch connected to the secondary winding to rectify the output voltage, and an auxiliary switch. The gate terminal of the auxiliary switch is connected to the gate terminal of the first synchronous rectifier switch and the positive end of the secondary winding, the source terminal thereof is connected to the drain terminal of the first synchronous rectifier switch and the negative end of the secondary winding, and the drain terminal thereof is connected to the gate terminal of the second synchronous rectifier switch.

Zero voltage switching is known and refers to a circuit or device for opening and closing a circuit, or for connecting a line to one of several different lines, which operates in the complete absence of voltage or the lowest voltage in a circuit to which all other voltages are referred. It is known in the art to incorporate zero-voltage switching circuit configurations into converter applications. These ZVS configurations have been incorporated into either the primary or secondary side of converters. See R. Watson and F. C. Lee, "Analysis, design, and experimental results of a 1-kW ZVS-FB-PWM converter employing magamp secondary-side control," *IEEE Trans. Industrial Electronics.*, vol. 45, pp. 806–814, October 1998.

Furthermore, it is known in the art to provide transformer connections of coils or load devices with more than one-or two-phases. Three-phase transformer connections consist of three transformers that are either disposed separately on adjacent cores or combined on a single core. The primaries and secondaries of any three-phase transformer can be independently connected in either a wye (Y) or a delta (Δ) connection. A delta connection is used to connect an electrical apparatus to a three-phase circuit, the three corners of the delta are represented as being connected to the three wires of the supply circuit. The delta connection is a triangular connection and resembles a Greek letter delta.

A wye connection is also used for connecting an electrical apparatus to a three-phase circuit. The wye connection is a method of connecting three windings so that one terminal of each winding is connected to a neutral point. The wye connection is shaped like the letter Y. In three-phase transformer applications, the primary and the secondary can have either a wye or a delta connection. Four possible connections are available for the primary-secondary configuration. These are wye-wye, wye-delta, delta-wye and delta-delta. A three-phase transformer bank may be composed of independent transformers or wound on a single three-legged core. See Stephen J. Chapman, "Electric Mmachine and power system fundamentals", McGraw-Hill Companies, Section 3.10, 2002.

None of the above inventions and patents, taken either singularly or in combination, is seen to describe the instant invention as claimed.

SUMMARY OF THE INVENTION

The present invention proposes a high output current and high efficiency topology. The DC/DC converter of the present invention has a transformer with a primary winding connected to a primary side and a secondary winding connected to a secondary side. The primary winding has n coils and the secondary winding has n coils. The primary side has n primary legs equal to the number of coils in the primary winding wherein each primary leg has a top switch and a bottom switch, and is connected to the primary winding between the top and bottom switches. The secondary side has n secondary legs equal to the number of coils in the secondary winding wherein each secondary leg has a synchronous rectifier switch and an output filter inductor, and is connected to the secondary winding therebetween.

Compared to a conventional phase-shift full bridge converter with Current-Doubler rectifier, the proposed zero-voltage switching multi-phase interleaving isolated DC/DC converter reduces the synchronous rectifier conduction loss as well as the transformer winding loss. Furthermore, the proposed transformer structure is compact so the power density of the converter can be greatly increased. Analysis and experimental results show that the proposed topology demonstrates great advantages when the converter output current goes higher and voltage goes lower as demanded by future microprocessors.

The present invention can significantly increase the output current and power density of a 48 V DC/DC isolated converter, such as a DC/DC brick converter for telecommunication, without adding much cost. Furthermore, it can be widely used in the field of low voltage high current applications such as voltage regulator modules for microprocessors.

The proposed multi-phase interleaving isolated DC/DC converter has many useful aspects. One aspect of the present invention is that it achieves zero voltage switching for the primary side switches, which not only reduces the high frequency switching loss, but also attenuates EMT noise. The phrase, zero-voltage, refers to the complete absence of voltage or the lowest voltage in a circuit to which all other voltages are referred. The present invention also exhibits reduced synchronous rectifier conduction loss, reduced transformer winding loss, and reduced transformer core loss. Another aspect of the present invention is a compact transformer structure as compared with distributed magnetics. Furthermore, the present invention results in reduced output ripple current when compared with current-doubler rectifiers. The present invention results in a low cost solution for higher output current applications.

The circuit of the present invention is simple and highly efficient. It may be used in the field of low voltage-high current applications, such as 48V power pods for microprocessors and 48V DC/DC brick converters for telecommunication.

These and other aspects of the present invention will become readily apparent upon further review of the following drawings and specification.

BRIEF DESCRIPTION OF THE DRAWINGS

The foregoing and other aspects of the present invention will be better understood from the following detailed description of embodiments of the invention with reference to the drawings, in which:

FIGS. 12*a* and 2*b* are diagrams depicting a four phase transformer winding connection and a four phase transformer winding structure respectively according to an embodiment of the present invention.

Similar reference characters denote corresponding, or similar features, consistently throughout the attached drawings.

DETAILED DESCRIPTION OF PREFERRED EMBODIMENTS

Figure 1:
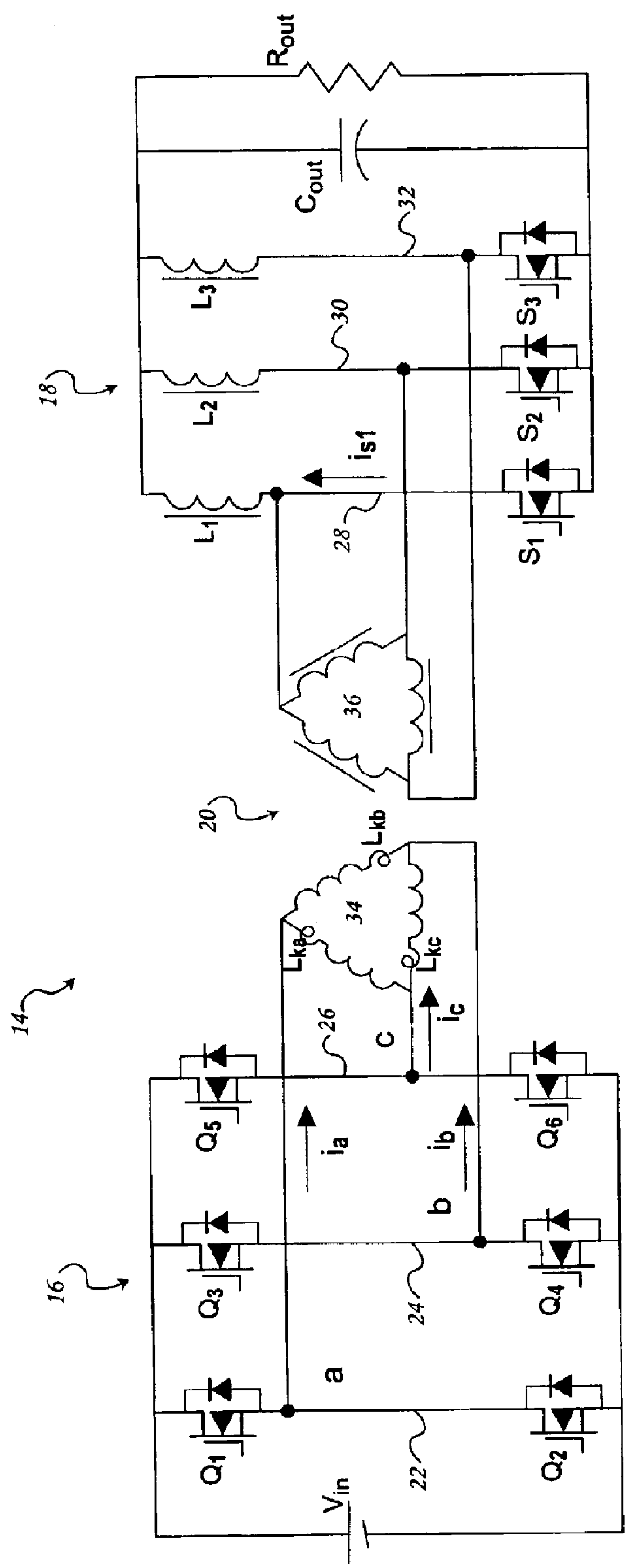
FIG. 1 is a circuit diagram of an embodiment of the ZVS Current Tripler DC/DC converter according to the present invention.

The circuit diagram for a zero-voltage switch (ZVS) current tripler DC/DC converter 14, according to the present invention, is depicted in FIG. 1. The converter of the present invention converts an input voltage into an output voltage. In order to simplify the analysis of the converter, it is assumed that the circuit operation is in steady state, the output filter inductors are large enough to be considered a current source, all devices are ideal, and the transformer magnetizing current is neglected.

The DC/DC converter 14 has a transformer 20, a primary side 16 connected to a power source, denoted $V_{in}$, and a secondary side 18 connected to an output capacitor $C_{out}$ and an output load, denoted $R_{out}$. Together, the output capacitor $C_{out}$ and the output load $R_{out}$ are referred to herein as an output filter. The transformer 20 has a primary winding 34 connected to the primary side 16 and a secondary winding 36 connected to the secondary side 18. Each winding is a tertiary winding therefore the primary winding 16 has three coils and the secondary winding 36 also has three coils. The windings are arranged in a delta-delta configuration, as discussed hereinbelow. The direction of current is indicated in FIG. 1 by the arrows depicted as $i_a$, $i_b$, $i_c$ on the primary side 16 and by the arrow depicted $i_{s1}$ on the secondary side 18.

There are three primary switch legs 22, 24 and 26 at the primary (input) side 16. Six primary switches, $Q_1$~$Q_6$, are provided on the three primary legs 22, 24 and 26. In each primary leg 22, 24 or 26 the top primary switch $Q_1$, $Q_3$ or $Q_5$ and the bottom primary switch $Q_2$, $Q_4$ or $Q_6$ are operated at a complimentary mode via a complimentary control. The required isolation of the primary (input) side 16 and the secondary (output) side 18 is achieved by the three-phase transformer 20. Each primary leg 22, 24 or 26 is connected, at a, b or c, to the primary winding 34 between the top switch $Q_1$, $Q_3$ or $Q_5$ and the bottom switch $Q_2$, $Q_4$ or $Q_6$. A leakage inductor Lka, Lkb, or Lkc may be disposed in the transformer adjacent each coil between the coil and a corresponding leg, as shown in FIG. 1.

A structure including three synchronous rectifiers, which is referred to as a current tripler, is proposed to reduce the conduction loss of the secondary side 18. The current tripler has three secondary legs 28, 30 and 32. Each secondary leg 28, 30 or 32 has a secondary switch $S_1$, $S_2$ or $S_3$, and an output inductor $L_1$, $L_2$ and $L_3$. The secondary switches are synchronous rectifier switches. The three secondary legs 28, 30 and 32 are connected, at A, B and C, to the secondary winding 36 for rectifying the output voltage.

Figure 2:
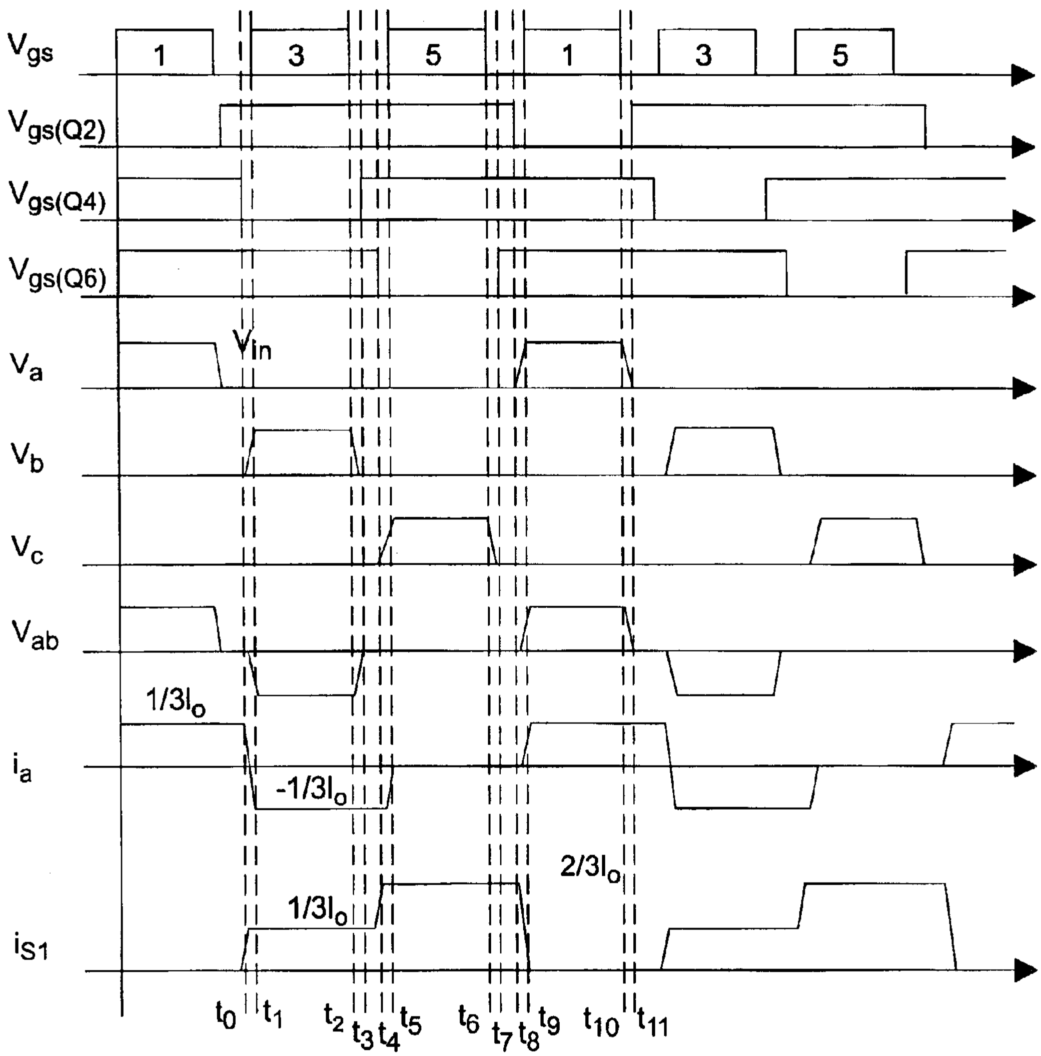
FIG. 2 is a switching timing diagram of a control strategy of the proposed ZVS Current Tripler DC/DC converter depicted in FIG. 1.

In order to achieve zero-voltage-switching of the proposed topology, a complimentary control is used. The switch timing diagram for the primary switches $Q_1$~$Q_6$ and secondary synchronous rectifier switches $S_1$~$S_3$ are shown in FIG. 2. Based on the switching timing diagram, there are 12 operating modes during one switching cycle.

Mode 1 [$t_0$~$t_1$]: The leakage inductor of the transformer resonates with output capacitors of $Q_3$ and $Q_4$. The output capacitor of $Q_3$ is discharged and that of $Q_4$ is charged. At certain load conditions, the energy stored in the leakage inductors $L_{ka}$, $L_{kb}$, and $L_{kc}$ is large enough to achieve ZVS for $Q_3$. Leakage inductance is the self-inductance caused by leakage flux. Leakage inductance is effectively in series with the primary or secondary winding of a transformer. Leakage flux is, collectively, magnetic lines of flux around a transformer that do not link the primary and secondary coils.

Mode 2 [$t_1$~$t_2$]: During this time interval, the energy is transferred from primary side to secondary side through $Q_3$, winding bc and ba, then $Q_2$ and $Q_6$.

Mode 3 [$t_2$~$t_3$]: At $t_2$, $Q_3$ is turned off and the reflected load current is used to charge the output capacitor of $Q_3$ and to discharge the output capacitor of $Q_4$ to achieve ZVS of $Q_4$.

Mode 4 [$t_3$~$t_4$]: During this interval, the energy stored in leakage inductor of transformer $L_{ka}$, $L_{kb}$ and $L_{kc}$ is freewheeling through the path of $Q_4$, winding bc and ba, and $Q_2$ and $Q_6$. From $t_0$ to $t_4$, leg b completes its two switching transitions that are all under zero voltage switching condition. Freewheeling is when no power is being transferred from the primary side to the secondary side of the transformer through the specified path.

For Modes 4 through 12 the following applies. From $t_4$ to $t_g$, another switch leg, leg c, executes its two zero voltage switching with the same operation principle as leg b. From $t_8$ to $t_{12}$, leg a does the same function.

From FIG. 2, we can also easily find that the gate signal for the synchronous rectifier is the same as the gate signal for corresponding primary bottom switches. This means that the drain-source voltage across $Q_1$, $Q_2$, and $Q_3$ can be used to drive the synchronous rectifier switches, namely $S_1$, $S_2$, and $S_3$ respectively.

Figure 3:
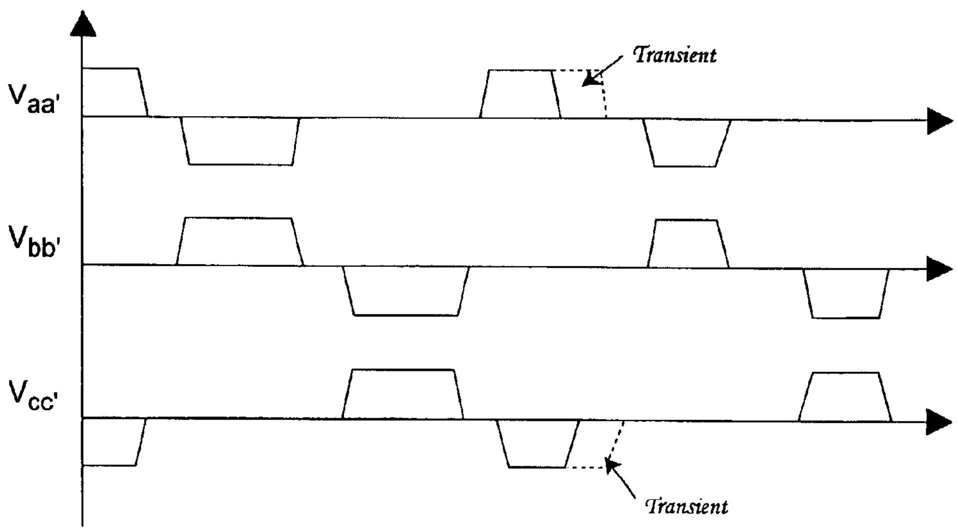
FIG. 3 is a waveform diagram depicting the voltage waveforms across the three transformer windings of the present invention.

FIG. 3 is a waveform diagram depicting the voltage waveforms across the three transformer windings at steady state. It is easily observed that $V_{aa'}+V_{bb'}+V_{cc'}=0$, which means that the AC flux of the three windings is cancelled out. In general, delta-delta connections have no phase shift associated therewith, and therefore, no problems with unbalanced loads or harmonics.

Another concern in delta-delta connection is the loop current around the windings. According to the voltage waveforms in FIG. 3, one can do the Fourier analysis to see if there is any 3n harmonics that will cause loop current along the windings. For one winding voltage, $V_{aa'}$, the Fourier expression is:

$$x(t) = C_0 + 2\sum^{\infty} |C_k|\cos(2\pi kF_0 t + \theta_k)$$

$$C_k = \frac{1}{T}\int_0^T x(t)e^{-j2\pi kF_0 t}\,dt = \frac{\left(e^{-j2\pi k\frac{1}{3}} - 1\right)\left(e^{-j2\pi kD} - 1\right)}{j2\pi k}$$

One can derive that $C_{3n}=0$. There is no loop current along the windings as long as the winding voltage waveforms are the same as shown in FIG. 3.

Figure 4A:
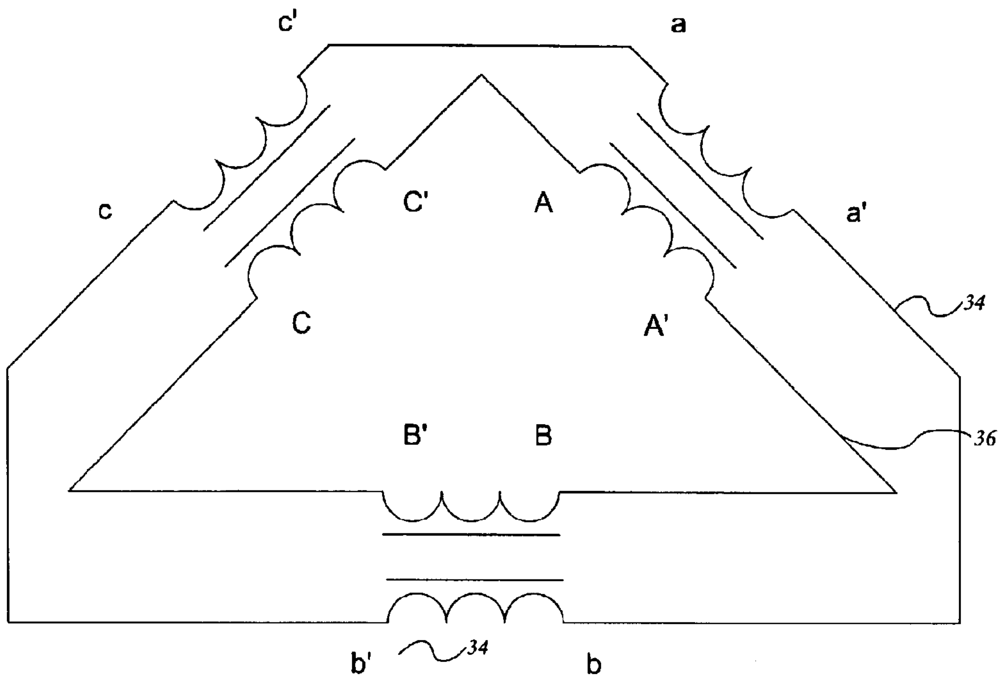
FIGS. 4*a* and 4*b* are diagrams depicting a transformer structure for the DC/DC converter of the present invention
Figure 4B:
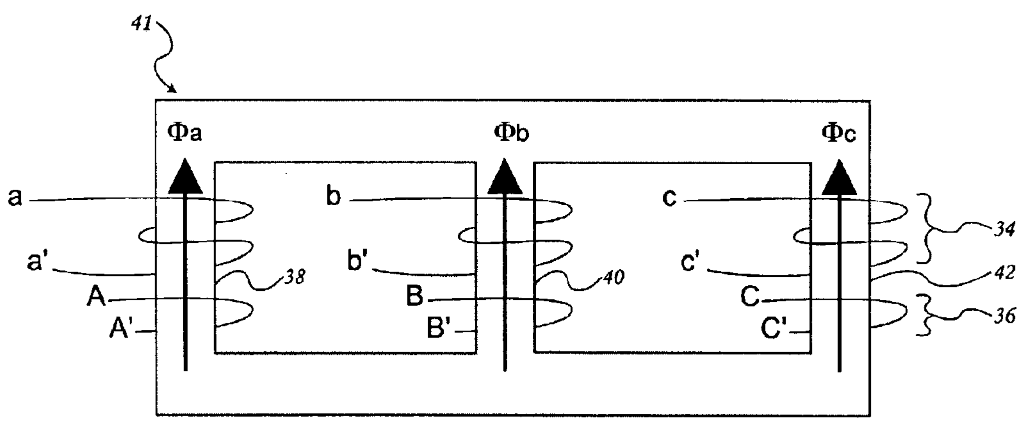

The magnetic structure can be simplified as one core with three legs, as shown in FIGS. 4*a* and 4*b*. The compact structure of the transformer also reduces the core loss since the total volume of the core is reduced. During the load transient, the duty cycle changes accordingly. The proposed transformer structure 41, shown in FIGS. 4*b*, 5*a*, 5*b*, and 6, can still keep the AC flux balanced. The reason for this is that the formula, $V_{aa'}+V_{bb'}+V_{cc'}=0$, is always valid, as demonstrated in FIG. 3. In high current applications, a planar core with printed circuit board (PCB) windings may be used.

Figure 6:
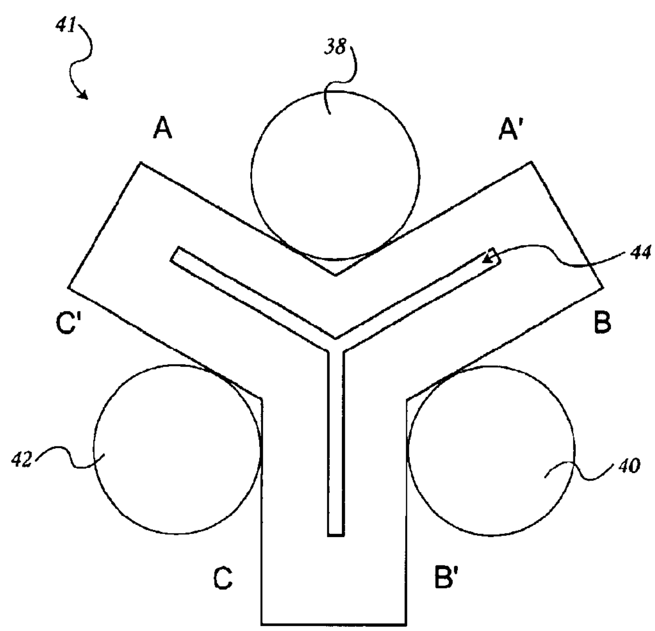
FIG. 6 is a diagram demonstrating another alternative PCB windings which may be used to simplify the transformer structure depicted in FIG. 4.
Figure 5A:
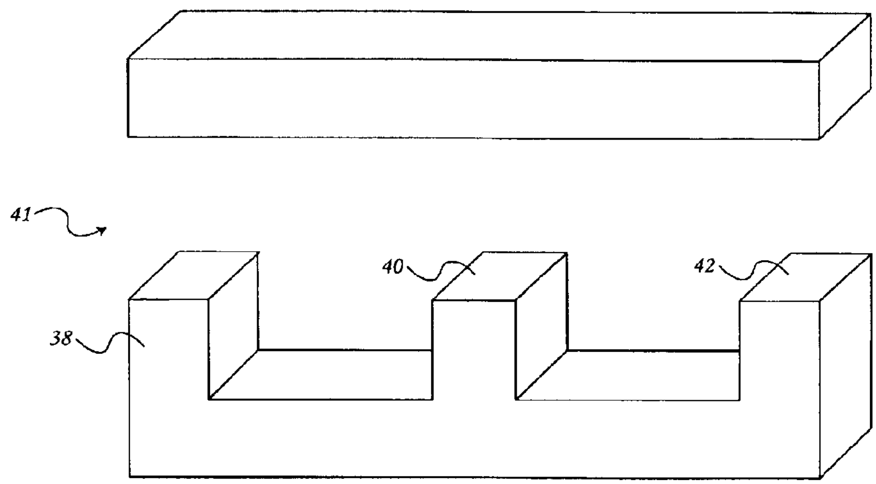
FIGS. 5*a* and 5*b* are diagrams depicting an alternative PCB windings which may be used to simplify the transformer structure depicted in FIG. 4.
Figure 5B:
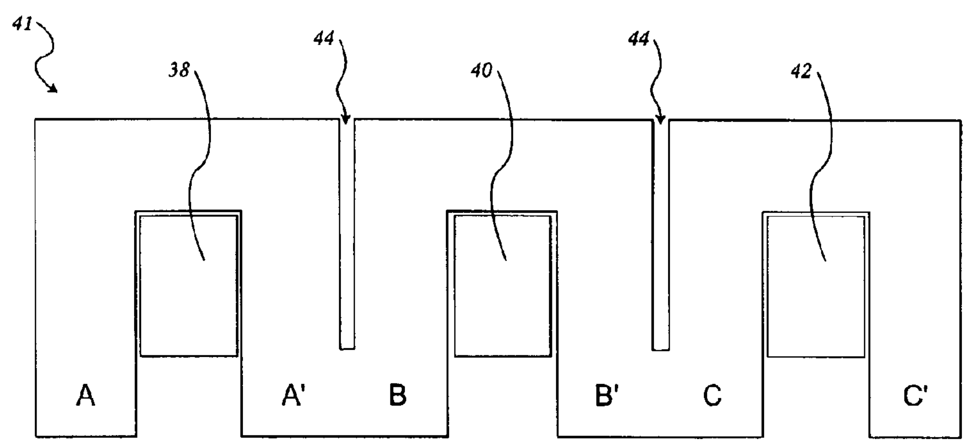

The transformer structure in FIGS. 4*a* and 4*b* can use different shapes of PCB windings such as those shown in FIGS. 5*a*, 5*b* and 6. FIGS. 5*a* and 5*b* show one implementation of a current tripler transformer structure 41 using customized EI cores. FIG. 5*a* shows the customized El for a current tripler according to the present invention. FIG. 5*b* shows the winding structure for the secondary side.

The transformer structure 41 in FIG. 6 represents the secondary windings only, which are delta connected. The winding structure for a three-phase high frequency transformer has a primary winding 34 and a secondary winding 36 each having three coils. With reference to FIGS. 4*b* and 6, a first coil a–a' of the primary winding 34 and a first coil A–A' of the secondary winding 36 are disposed on a first core 38. A second coil b–b' of the primary winding 34 and a second coil B–B' of the secondary winding 36 are disposed on a second core 40. And a third coil c–c' of the primary winding 34 and a third coil C–C' of the secondary winding 36 are disposed on a third core 42. Each core 38, 40 or 42 is arranged vertically adjacent to one another in a delta arrangement, as shown. An insulator 44 may be disposed between the windings.

Likewise, FIGS. 5*a* and 5*b* represents the secondary winding only of the customized EI core transformer structure 41, which are also delta connected. The winding structure for this embodiment of the three-phase high frequency transformer has a primary winding 34 and a secondary winding 36 each having three coils. With reference to FIGS. 4*b*, 5*a* and 5*b*, a first coil a–a' of the primary winding 34 and a first coil A–A' of the secondary winding 36 arc disposed on a first core 38. A second coil b–b' of the primary winding 34 and a second coil B–B' of the secondary winding 36 are disposed on a second core 40. And a third coil c–c' of the primary winding 34 and a third coil C–C' of the secondary winding 36 are disposed on a third core 42. Each core 38, 40 or 42 is arranged vertically adjacent to one another in a delta arrangement. An insulator 44 may be disposed between the windings.

Figure 7:
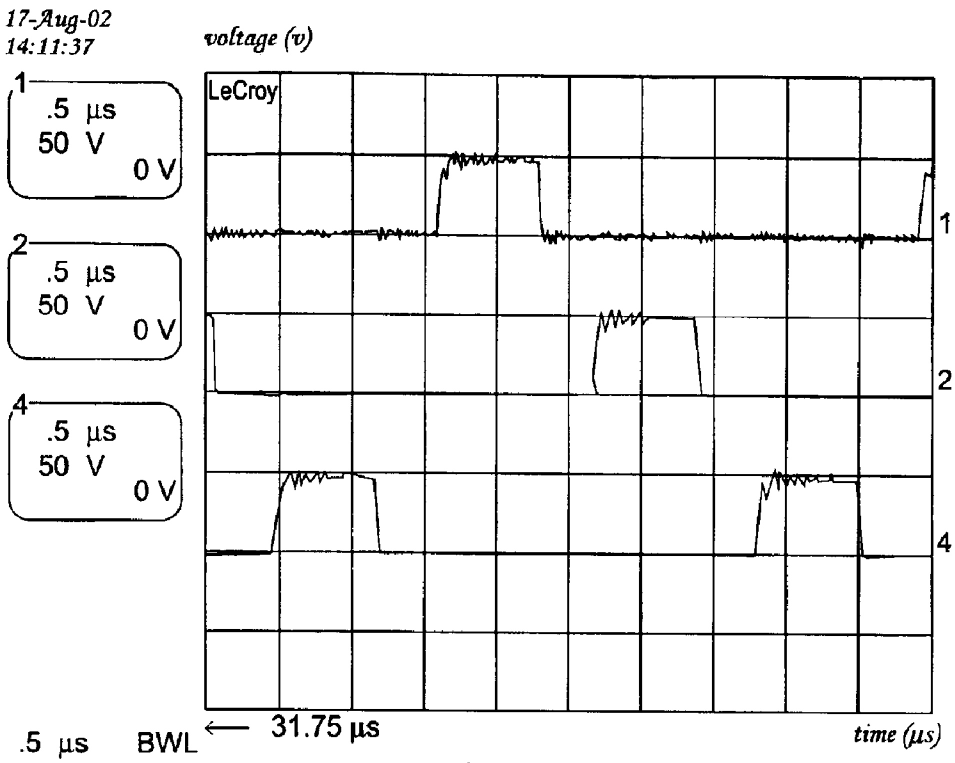
FIG. 7 is an experimental graph demonstrating the ZVS condition for the primary switches, namely the drain-source voltages for three primary switch legs.
Figure 8:
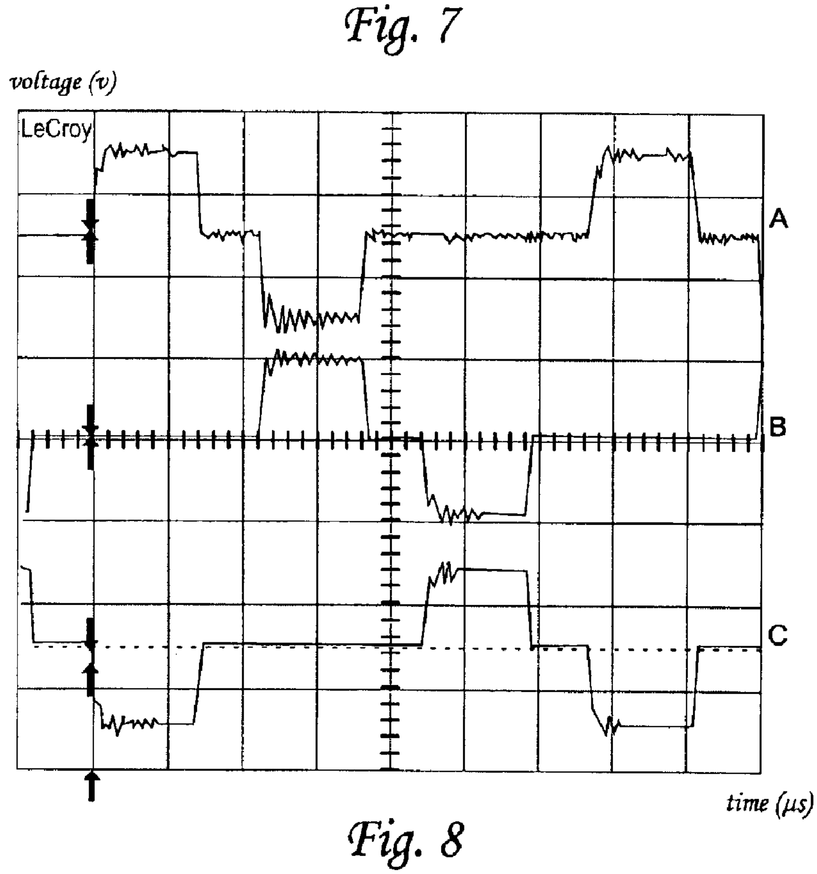
FIG. 8 is an experimental graph demonstrating the balanced volt-second of the three transformer windings, namely the transformer winding voltages.
Figure 9:
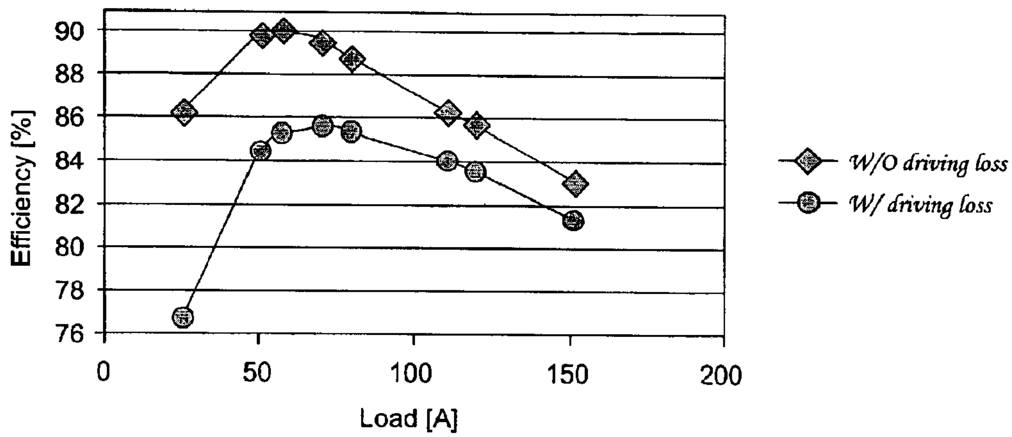
FIG. 9 is a graph indicating the measured efficiency of the ZVS Current-Tripler voltage regulator module (VRM).

An experiment was implemented and the results are depicted in FIGS. 7–9. FIG. 7 shows the drain-source voltages for the three primary switch legs. FIG. 8 shows the transformer winding voltages. Due to the zero voltage switching, the waveforms are very clean. FIG. 8 also matches the theoretical waveforms in FIG. 3. FIG. 9 shows the efficiency of the prototype with the following experimental setups:

a) Input voltage: 48V
b) Output voltage: 1.0V
c) Maximum load current: 150 A @ Vo=1.0V
d) Switching frequency: 300 kHz Experimental results show that the efficiency at 150 A/1V is 81.6%.

Figure 10:
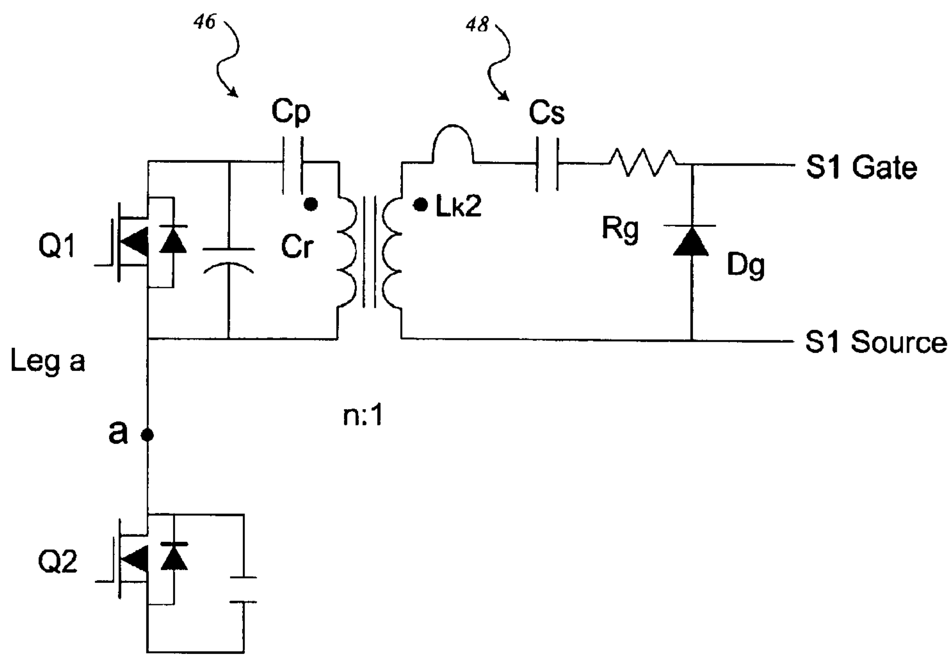
FIG. 10 is a circuit diagram depicting a simplified self-drive scheme for a synchronous rectifier.

A simplified self-driven scheme for a DC/DC converter is illustrated in FIG. 10. The self-driven scheme provides a complimentary control for each leg of a multi-phase isolated DC/DC converter according to the present invention. The self-driven scheme is demonstrated as a simplified circuit 46, which shows only one primary leg, designated leg a in FIG. 10, and the corresponding synchronous rectifier. The second side only shows the first secondary leg 48 (switch S1, inductor $L_{k2}$, etc.). A phase shift is generated by the self-driven scheme whereby the phase shift angle is 360° divided by the phase number. For each primary side leg, a gate driver transformer with primary winding in series with a DC blocking (level shift) capacitor $C_p$ is connected to the drain and source of the top switch of the leg. For each primary side leg, a gate drive transformer with secondary winding containing a leakage inductor $L_{k2}$ and in series with a DC blocking (level shift) capacitor $C_s$ and a damping resistor $R_g$ is connected to the gate and source of the secondary side synchronous rectifier. A Schottky diode $D_g$ is connected with its anode to the source of the synchronous rectifier and its cathode to the gate of the synchronous rectifier. A Schottky diode is a solid-state diode in which a metal and a semiconductor form a pn junction. Electrons injected into the metal have a higher energy level than the charge carriers in a semiconductor, and energy storage at the junction is low because current flow is not accompanied by hole movement.

Figure 11:
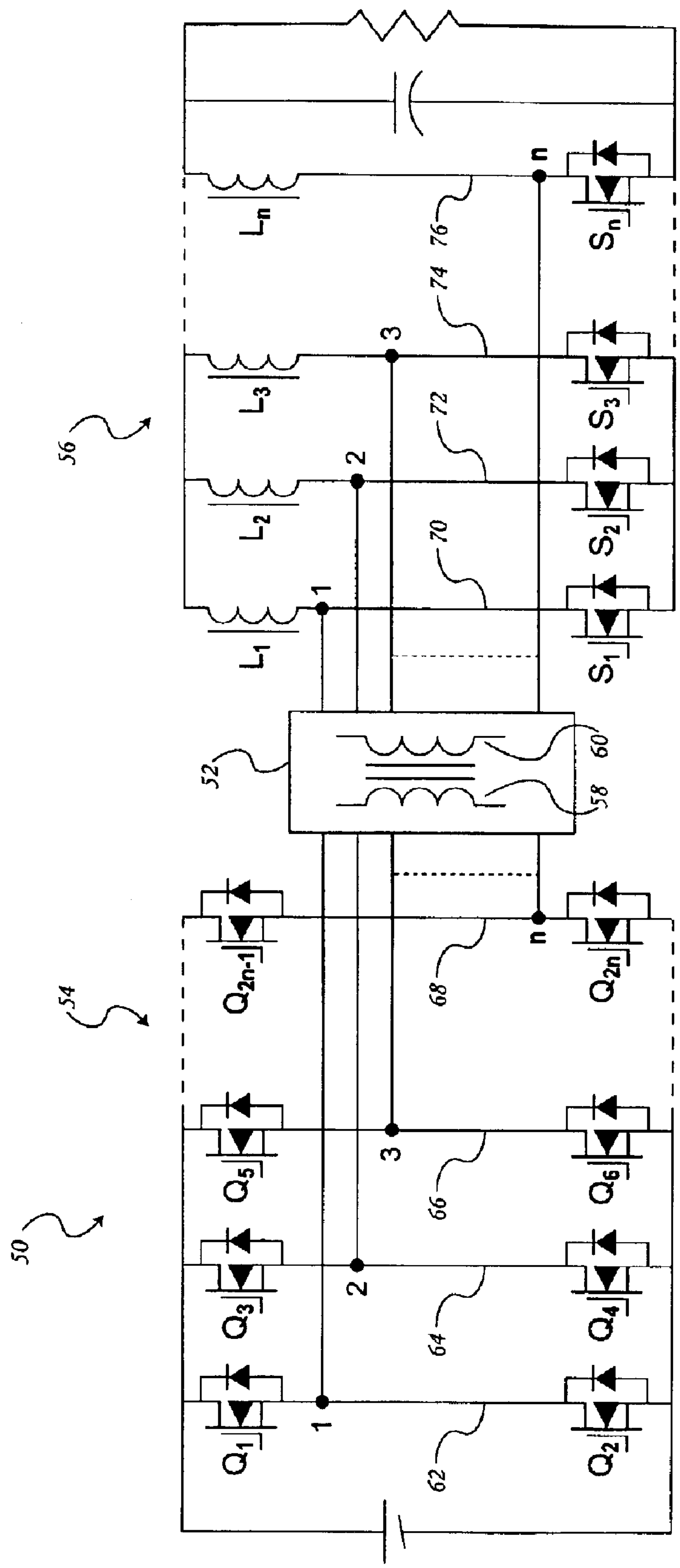
FIG. 11 is a circuit diagram of an embodiment of a multi-phase interleaving isolated DC/DC converter according to the present invention.

The proposed concept of the present invention can be easily extended to a multi-phase interleaving isolated DC/DC converter 50, as shown in FIG. 11. In this embodiment, the converter 50 has a transformer 52, a primary side 54 connected to a power source, and a secondary side 56 connected to an output filter. The transformer 52 has a primary winding 58 connected to the primary side 54 and a secondary winding 60 connected to the secondary side 56 for converting an input voltage into an output voltage. The primary winding 58 has a plurality of coils and the secondary winding 60 has a plurality of coils.

The primary side 54 has a plurality of primary legs 62, 64, 66, 68 equal to the number of coils in the primary winding 58. Each primary leg has a top switch $Q_1$, $Q_3$, $Q_5$, or $Q_{2n-1}$ and a bottom switch $Q_2$, $Q_4$, $Q_6$, and $Q_{2n}$. Each primary leg is connected (at 1, 2, 3, n, where n is equal to the number of legs or coils) to the primary winding 58 between the top and bottom switches, as shown.

The second side 56 further has a plurality of secondary legs 70, 72, 74 and 76 equal to the number of coils in the secondary winding. Each secondary leg has a synchronous rectifier switch $S_1$, $S_2$, $S_3$ and $S_n$, and an output filter inductor $L_1$, $L_2$, $L_3$ and $L_n$ opposite each synchronous rectifier switch such that the secondary winding 60 is connected to each secondary leg between the output filter inductor and the synchronous rectifier switch. Preferably, the primary winding and the secondary winding have an equal number of coils.

Figure 12A:
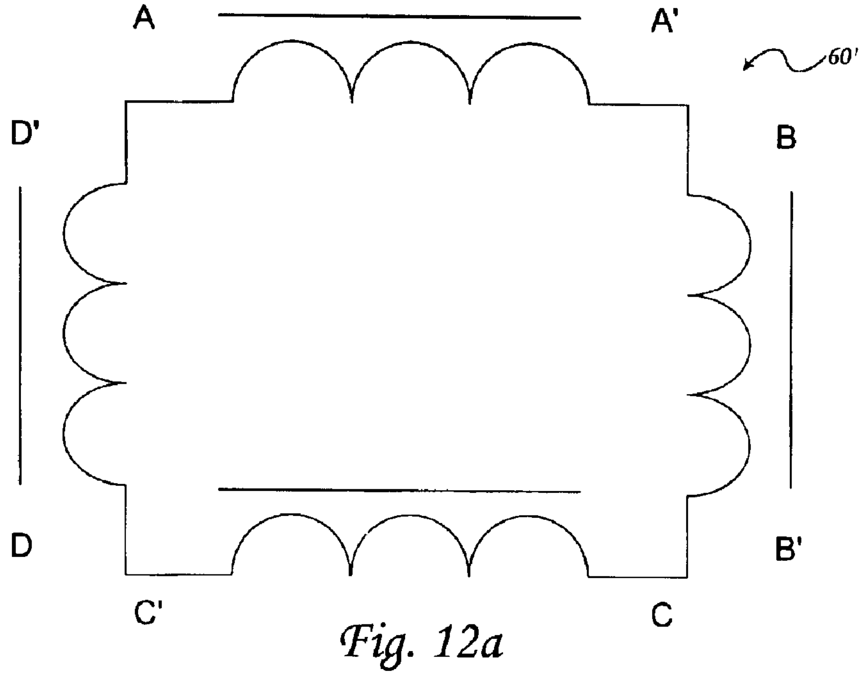
Figure 12B:
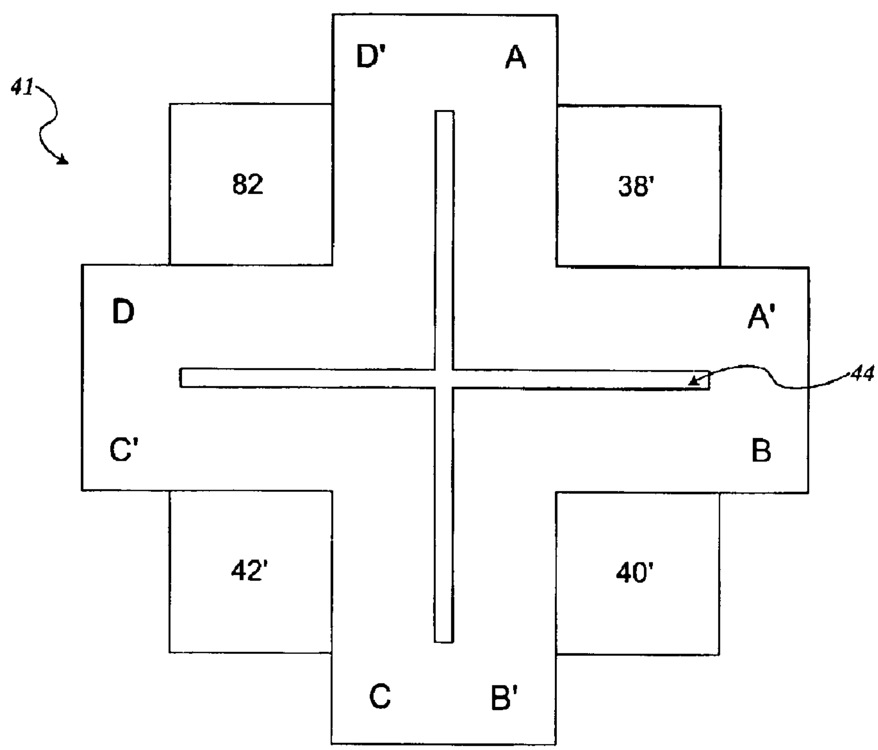

FIG. 12*a* shows the winding connection of four phases. N phases can be analogized easily. FIG. 12*b* shows the winding structures for a four phase transformer. Only the secondary winding 60' is shown in FIGS. 12*a*and 12*b*, the primary winding is easily visualized from the secondary winding 60', as shown and discussed hereinabove with respect to the three phase winding and transformer depicted in FIGS. 4*a*, 4*b*, 5*a*, 5*b*, and 6. The winding structure for the embodiment of a four-phase high frequency transformer has a primary winding (not shown) and a secondary winding 60' each having four coils. A first coil a–a' of the primary winding and a first coil A–A' of the secondary winding 60' are disposed on a first core 38'. A second coil b–b' of the primary winding and a second coil B–B' of the secondary winding 60' are disposed on a second core '. A third coil c–c' of the primary winding and a third coil C–C' of the secondary winding 60' are disposed on a third core 42'. And a fourth coil d–d' of the primary winding and a fourth coil D–D' of the secondary winding 60' are disposed on a fourth core 82'. Each core 38', 40', 42' and 82 is arranged vertically adjacent to one another in series forming a series-series arrangement analogous to a delta-delta arrangement for a three phase transformer according to the present invention. An insulator 44 may be disposed between the windings. The expansion of the number of coils according to n phases is easily visualized.

Figure 13:
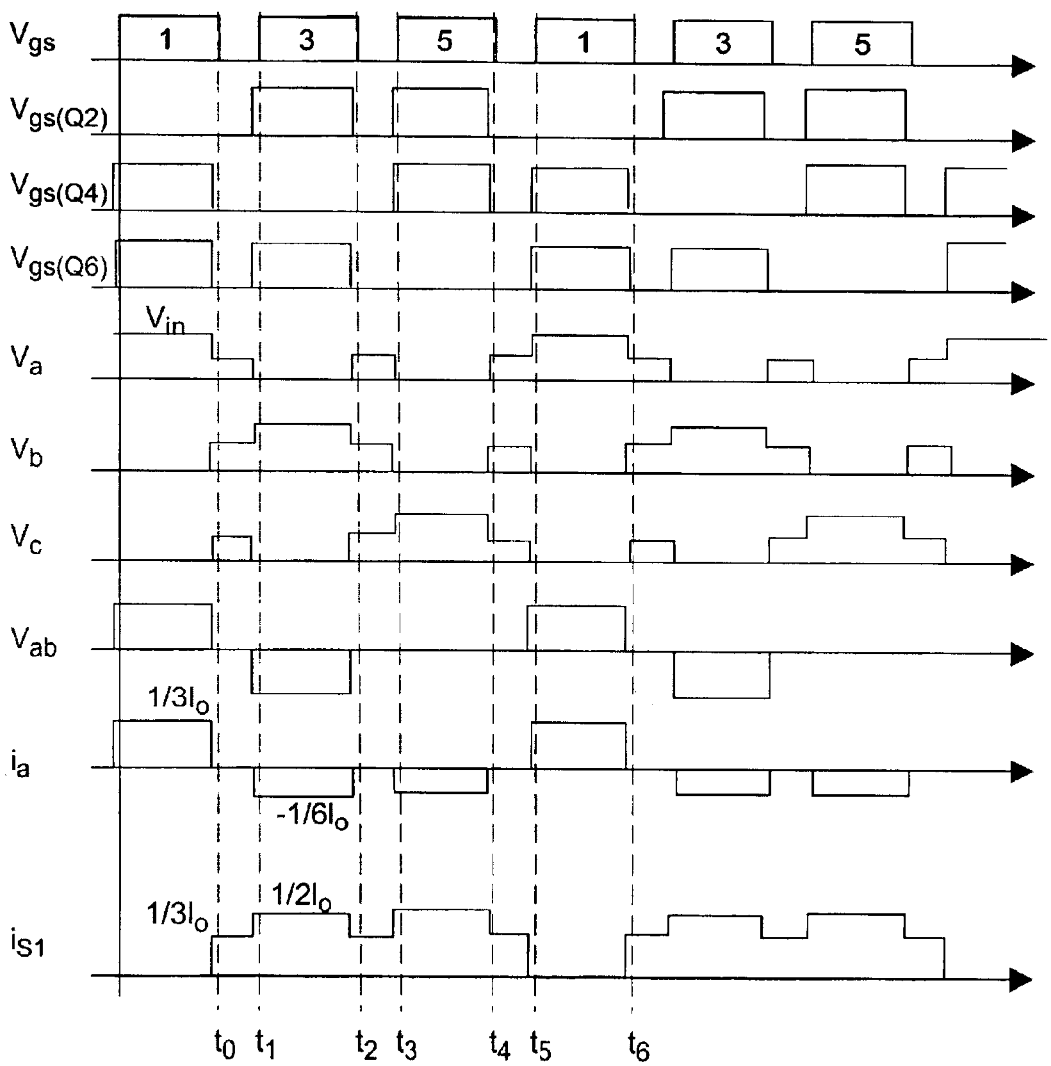
FIG. 13 is a switching timing diagram of a control strategy for the present invention functioning at non-ZVS conditions.

The proposed topology can also work at non-ZVS conditions. FIG. 13 shows the switching timing diagram of the circuit, shown in FIG. 11, working at non-ZVS conditions.

Figure 14A:
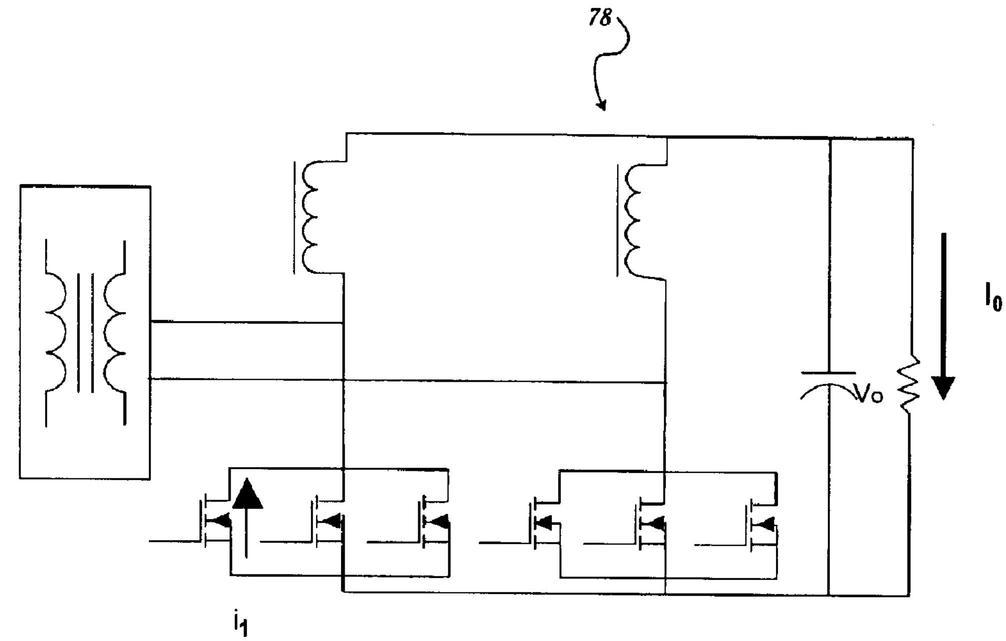
FIGS. 14*a* and 14*b* show circuit diagrams of a current doubler and a current tripler respectively for synchronous rectification conduction loss comparison.
Figure 14B:
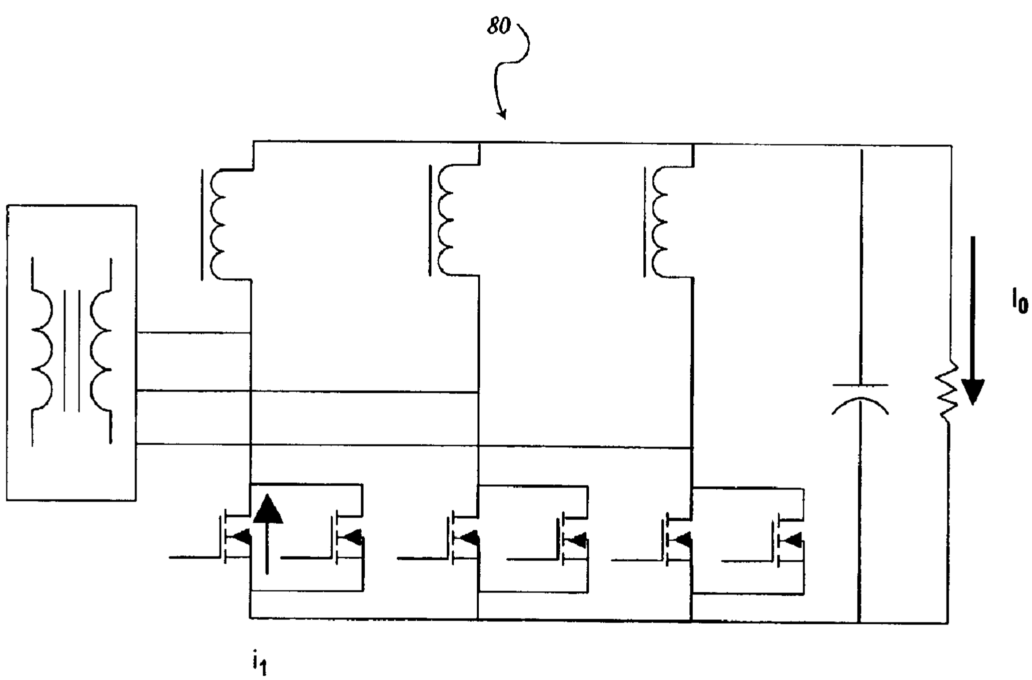

A secondary side conduction loss comparison between two topologies: one is the phase shift full bridge converter with a current doubler rectifier 78, shown in FIG. 14*a*, and the other is the proposed three-phase converter with a current tripler rectifier 80, shown in FIG. 14*b*. Both of them can achieve ZVS under certain load condition. Suppose the output current is the same, and the number of the rectifier devices is also the same, as illustrated in FIGS. 14*a* and 14*b*. Six of the same devices are used for each topology. The RMS (root mean square) current (effective current) through one device can be calculated respectively. For the current doubler, the RMS current is $$\frac{I_o}{6}\sqrt{2},$$

and for the current tripler, it becomes $$\frac{I_o}{6}\sqrt{\frac{5}{3}}.$$

The total conduction loss saving of the current tripler is 20%. Similarly, the RMS current going through the transformer secondary windings are different for these two topologies. Suppose the same windings are used. For the current doubler, the secondary are in parallel. For the current tripler, the three secondary windings are delta connected. The total winding conduction loss saving of the current tripler is 12.5%. More loss savings are expected if we extend three-phase to four-phase or even higher, as conceptually illustrated in FIG. 11.

It is to be understood that the present invention is not limited to the embodiments described above, but encompasses any and all embodiments within the scope of the following claims.

What is claimed is:

1. A multi-phase interleaving isolated DC/DC converter comprising:

a transformer, a primary side connected to a power source, and a secondary side connected to an output filter;

said transformer having a primary winding connected to said primary side and a secondary winding connected to said secondary side for converting an input voltage into an output voltage, wherein said primary winding has a plurality of coils and said secondary winding comprises a plurality of coils;

said primary side further has a plurality of primary legs equal to the number of coils in said primary winding, wherein each primary leg has a top switch and a bottom switch, and is connected to said primary winding between said top and bottom switches; and said secondary side further comprises at least one output filter inductor connected to said secondary winding.

2. The converter of claim 1, wherein:

said second side further comprises a plurality of secondary legs equal to the number of coils in said secondary winding, wherein each secondary leg has a synchronous rectifier switch and is connected to said secondary winding for rectifying said output voltage.

3. The converter of claim 2, wherein:

said secondary side has a plurality of output filter inductors equal in number to the number of secondary legs, wherein each output filter inductor is connected to each secondary leg opposite each synchronous rectifier switch such that said secondary winding is connected to each secondary leg between said output filter inductor and said synchronous rectifier switch.

4. The converter of claim 1, wherein:

said primary winding and said secondary winding comprise an equal number of coils.

5. The converter of claim 2, wherein:

said primary winding and said secondary winding comprise an equal number of coils.

6. The converter of claim 1 wherein said primary winding has three coils and said secondary winding has three coils, and said primary winding and said secondary winding are in delta-delta formation.

7. The converter of claim 1 wherein said primary winding and said secondary winding have an equal number of coils, and said primary winding and said secondary winding are in a series-series formation.

8. The converter of claim 2 wherein said primary winding and said secondary winding have an equal number of coils, and said primary winding and said secondary winding are in a series-series formation.

9. The converter of claim 2 wherein said primary winding and said secondary winding have an equal number of coils, and said primary winding and said secondary winding are in a series-series formation.

10. The converter of claim 1, wherein a leakage inductor is disposed in series with each primary coil.

11. The converter of claim 2, wherein a leakage inductor is disposed in series with each primary coil.

12. The converter of claim 3, wherein a leakage inductor is disposed in series with each primary coil.

13. A multi-phase interleaving isolated DC/DC converter comprising:

a transformer, a primary side connected to a power source, and a secondary side connected to an output filter;

said transformer having a primary winding and a secondary winding for converting an input voltage into an output voltage; wherein said primary winding and said secondary winding comprises an n winding each winding having n coils;

wherein said primary side has n primary legs wherein each has a top and a bottom switch, and is connected to said primary winding between said top and bottom switches;

wherein said secondary side has n secondary legs connected to said secondary winding; and further comprises an output filter inductor connected to said secondary winding.

14. The converter of claim 13, wherein:

an output filter inductor is connected to each secondary leg adjacent each synchronous rectifier switch.

15. The converter of claim 14 wherein:

said primary winding d said secondary winding are in a series-series formation.

16. The converter of claim 14, wherein:

each n coil of the primary winding and each n coil of the secondary winding are disposed on a corresponding n core;

and wherein each core is arranged vertically adjacent to one another in a series-series arrangement.

17. The converter of claim 15, further comprising:

an insulator disposed therebetween said windings.

18. The converter of claim 13, wherein a leakage inductor is disposed in series with each primary coil.

19. The converter of claim 13, wherein a leakage inductor is disposed in series with each secondary coil.

20. A winding structure for a three-phase high frequency transformer comprising:

a primary winding and a secondary winding each winding having n coils, wherein each n coil of the primary winding and each n coil of the secondary winding are disposed on each n core, wherein each core is arranged vertically adjacent to one another in a series-series arrangement.

21. The transformer winding arrangement of claim 20, wherein:

said primary winding and said secondary winding each winding having three coils, such that a first coil of the primary winding and a first coil of the secondary winding are disposed on a first core, a second coil of the primary winding and a second coil of the secondary winding are disposed on a second core, a third coil of the primary winding and a third coil of the secondary winding are disposed on a third core; and wherein each core is arranged vertically adjacent to one another in a delta-delta arrangement.

22. The transformer winding arrangement of claim 21, further comprising an insulator disposed between said windings.

23. The transformer winding arrangement of claim 20, wherein, said coils are arranged in an EI conformation.

24. A self-driven scheme for a DC/DC converter, comprising:

a complimentary control a multi-phase isolated DC/DC converter having n primary legs and n secondary legs, wherein said complimentary control for each primary leg comprises a gate driver transformer with winding in series with a DC blocking (level shift) capacitor Cp connected to a drain and a source of a top switch of each primary leg.

25. The self-driven scheme according to claim 24, further comprising:

a gate drive transformer, for each primary leg, with secondary winding containing a leakage inductor Lk2 and in series with a DC blocking (level shift) capacitor Cs and a damping resistor Rg is connected to the gate and source of the secondary side synchronous rectifier.

26. The self-driven scheme according to claim 24, wherein:

a phase shift having a phase shift angle is generated by the self-driven scheme whereby the phase shift angle is 360° divided by a phase number wherein the phase number is equal to n.

27. The self-driven scheme according to claim 25, wherein:

a phase shift having a phase shift angle is generated by the self-driven scheme whereby the phase shift angle is 360° divided by a phase number wherein the phase number is equal to n.

28. The self-driven scheme according to claim 24, further comprising a leakage inductor is disposed in series with each primary coil.

29. The converter of claim 13, wherein each secondary legs has a synchronous rectifier switch.

* * * * *